April 20, 1954  P. SCHELL  2,675,965
GAS MODULATING VALVE CONTROL
Filed Feb. 2, 1952  2 Sheets-Sheet 2
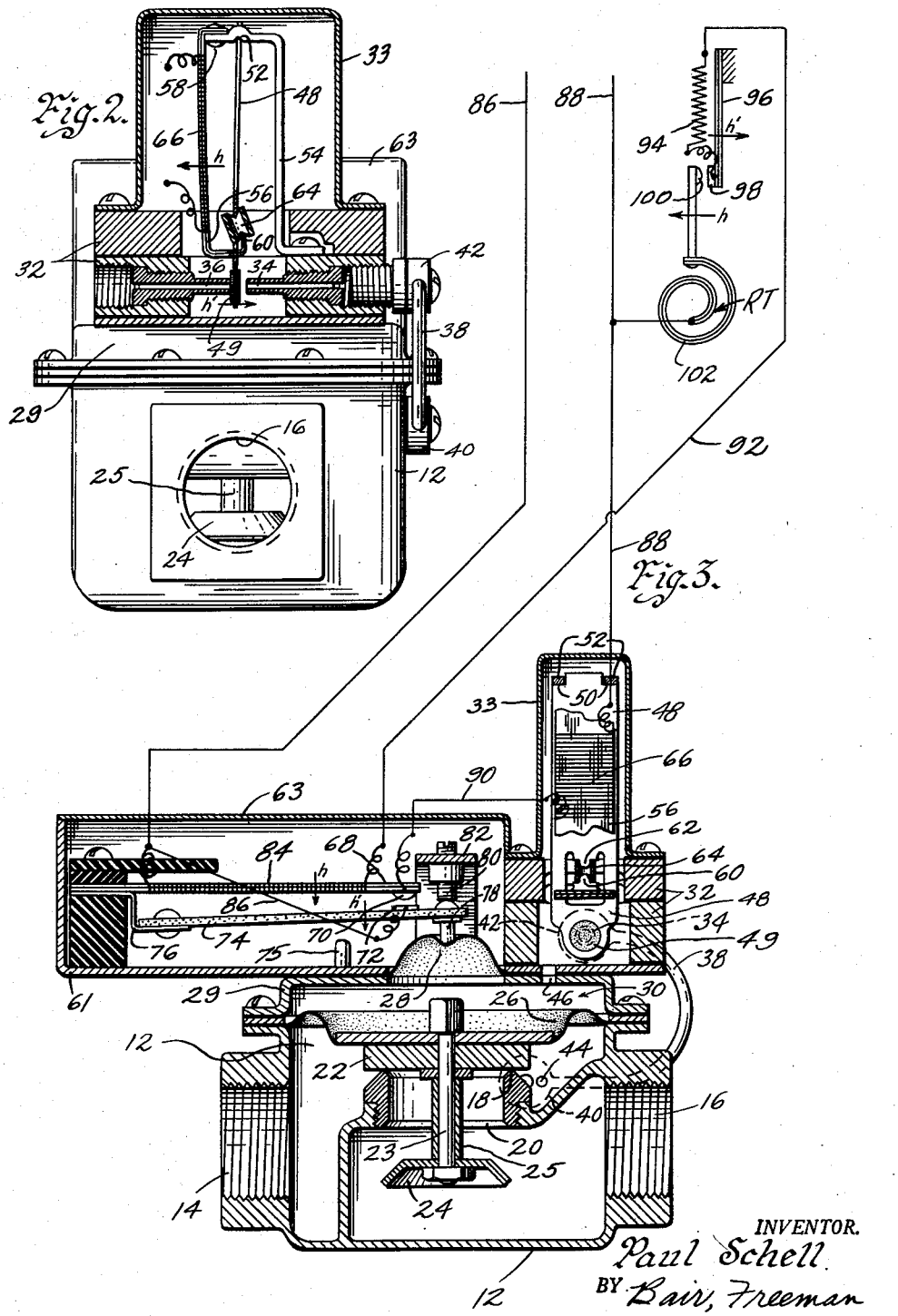
INVENTOR.
Paul Schell
BY Bair, Freeman
& Molinare
Attys.

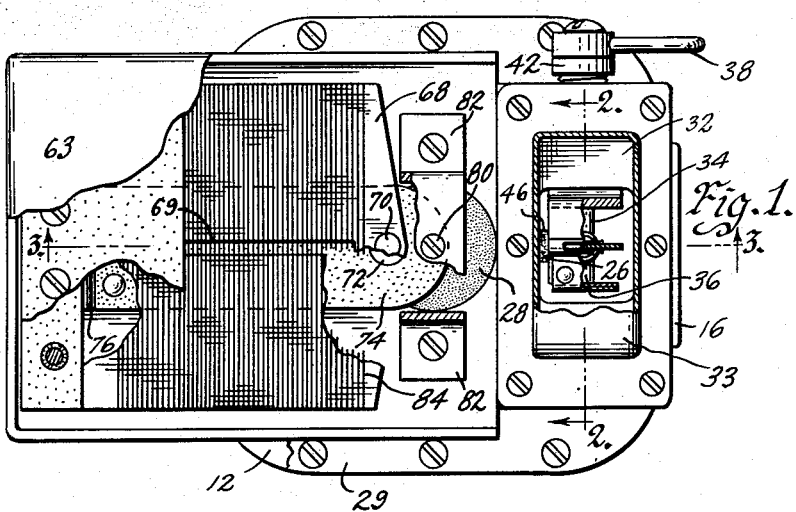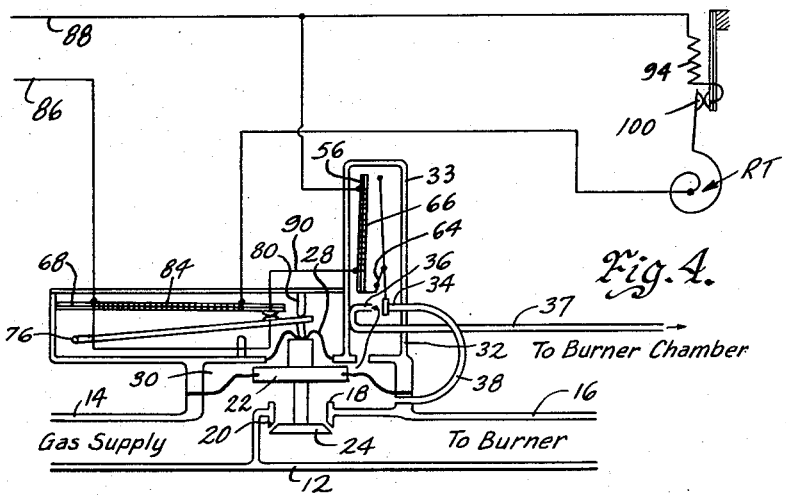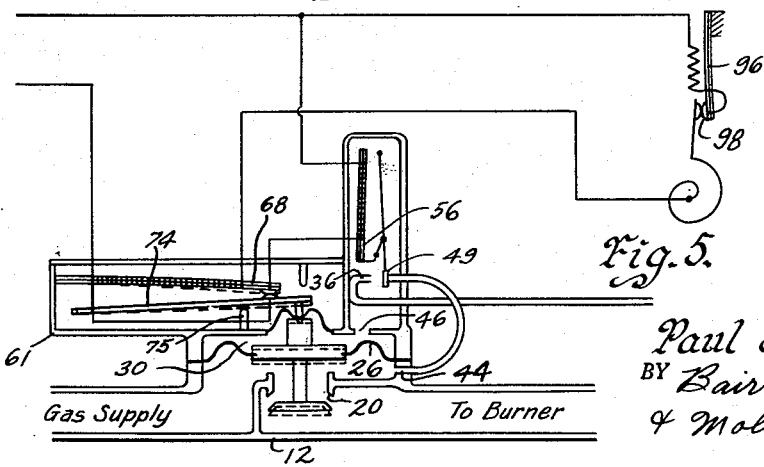

Patented Apr. 20, 1954

2,675,965

UNITED STATES PATENT OFFICE 2,675,965

GAS MODULATING VALVE CONTROL

Paul Schell, Elkhart, Ind., assignor to Penn Controls, Inc., Goshen, Ind., a corporation of Indiana Application February 2, 1952, Serial No. 269,624

6 Claims. (Cl. 236—68)

This invention relates to a gas modulating valve control and particularly one of the type which effects the operation of a combined on-off and modulating valve used as a controlling means between a source of gas or other fuel and a burner in a furnace or the like for heating a room.

One object of the invention is to provide a pilot control arrangement for a gas actuated diaphragm type of modulating valve which includes an electrically operable modulating means for the main valve and a pilot valve arrangement for opening and closing the main valve at the beginning and end respectively of a modulating cycle.

Another object is to provide a modulating valve structure which performs three functions: (1) a means for turning on and off the supply of fuel to a burner or the like; (2) a means for modulating the flow of the fuel after it has been turned on; and (3) a means for adjusting the minimum flame, the arrangement being such that functions (1) and (2) are handled entirely by a single electrically operated "heat motor" acting first on a pilot valve and secondly acting directly on the main valve to modulate it.

Still another object is to provide a modulating valve control arrangement wherein a diaphragm actuated valve is under control of both a pilot valve and an electric means for modulating the valve, the pilot valve being under control of the electric means for opening and closing the valve and the electric means performing the modulation of the valve after it is opened and until such time as it is closed, the electric means in turn being controlled by a modulating room thermostat or other condition responsive mechanism.

A further object is to provide an electrically operated pilot valve which is operated by a modulating device so as to open a main gas valve when the modulating mechanism begins a call for heat and to close it when the heat demands are satisfied.

Still a further object is to provide a combined modulating and cut-off valve device including pressure motor means, pilot control means operable in response to room temperature changes to open the valve device at a predetermined temperature when the temperature is dropping, and power means for modulating it when the room temperature is below the predetermined temperature, the power means modulating the valve device in accordance with room temperature after it is opened and the pilot control means again closing the valve device when the room thermostat responds again to the predetermined temperature but when it is rising.

An additional object is to provide modulating means for the valve device comprising a thermostatic motor which includes a heating coil, a room thermostat controlling the input to the heating coil and including a heater in series therewith and means responsive to heat from the heater for separating the contacts of the room thermostat whereby it acts as a modulating thermostat.

Another additional object is to provide means for controlling the pilot valve comprising contacts operated by the thermostatic motor to be closed when the room thermostat calls for heat and to remain closed as long as the motor is operating in the modulating range and thereby modulating the valve device in accordance with the demand for heat affecting the room thermostat.

A further additional object is to provide a modulating control for fuel flow to heating means comprising pressure motor means including a movable wall having a chamber on each side thereof, a pilot valve controlling pressures affecting the movable wall, a main fuel flow passageway sealed by the movable wall, a pair of spaced valve seats in the passageway, one of which constitutes a modulating valve seat and the other of which constitutes an on-off valve seat, and means operated at one of its limits of operation to actuate the pilot valve to effect opening of the on-off valve as the modulating motor moves away from the minimum modulated position and to effect closing thereof as it returns to minimum modulated position.

With these and other objects in view, my invention consists in the construction, arrangement and combination of the various parts of my gas modulating valve control, whereby the objects contemplated are attained, as hereinafter more fully set forth, pointed out in my claims and illustrated in the accompanying drawings, wherein:

Figure 1 is a plan view of my gas modulating valve control, parts thereof being broken away and other parts being shown in section to show details of construction.

Figure 2 is a vertical sectional view on the line 2—2 of Figure 1, the lower part of the valve structure being shown in elevation.

Figure 3 is a vertical sectional view on the line 3—3 of Figure 1, a room thermostat circuit being shown diagrammatically in connection therewith.

Figure 4 is a diagrammatic view showing the parts in a different position than that assumed in Figure 3; and Figure 5 is a diagrammatic view similar to Figure 4 showing the parts in still a different position.

On the accompanying drawings I have used the reference numeral 12 to indicate a valve body having an inlet 14 and an outlet 16, the inlet adapted to receive gas and the outlet to be connected with a burner such as one in a residential furnace.

The valve body 12 has an on-off valve seat 18 and a modulating valve seat 20. Within the valve body, an on-off valve closure element 22 is provided and a modulating valve element 24 is illustrated for coaction with the seats 18 and 20 respectively. The valve elements 22 and 24 are connected together for simultaneous movement by means of a stem 23 and a sleeve 25, and the valve element assembly, consisting of the elements 22, 23, 24 and 25, is connected with a valve operating diaphragm 26.

My valve structure also includes a sealing diaphragm 28 for a diaphragm cover 29 which cover in conjunction with the upper surface of the diaphragm 26 provides a pressure chamber 30.

Mounted on the valve body 12 and the diaphragm cover 29 thereof is a housing 61 and a pilot valve for operating the main valve to on and off positions. The pilot valve comprises a valve body 32. A pilot valve inlet seat 34 and a pilot valve bleed seat 36 are mounted in the valve body 32. A pressure supply tube 38 connects the inlet side of the valve body 12 with the pilot valve inlet seat 34, fittings 40 and 42 being provided at the ends of the tube 38 for this purpose. As shown in Figure 3, a port 44 to the pressure supply tube 38 is provided to introduce the incoming gas pressure to the tube 38. Communication between the interior of the pilot valve body 32 and the pressure chamber 30 is provided by a port 46.

The pilot valve 32—34—36 further includes a pilot valve blade 48 and has a valve closure element 49 adapted to operate between the inlet seat 34 and a bleed seat 36 with snap action as will hereinafter appear. The upper end of the blade 48 is provided with a pair of shoulders 50 which are seated in a pair of V seats 52 of a bracket 54.

A pilot valve actuating bimetal 56 is provided anchored as at 58 to the bracket 54 and provided on its lower end with a finger 60. Opposing the finger 60 is a finger 62 on the pilot valve blade 48 as shown in Figure 3. A toggle 64 in the form of a tube is provided with V seats on its upper and lower ends as shown in Figure 2, and the fingers 60 and 62 enter the tube with shoulders adjacent the fingers seated in the V seats whereby snap action is imparted to the blade 48 upon oscillation of the bimetal 56.

For producing such oscillation, the bimetal 56 is sprung to normally be in the position of Figure 2. When heated, it will swing toward the left as indicated by the arrow $h$ as to the position shown in Figures 4 and 5, whereupon the toggle tube 64 will be reversed in its inclination and the pilot valve closure element 49 will unseat from the bleed seat 36 and seat on the inlet seat 34 as shown in these two figures.

For operating the main valve, with respect to its modulating valve element 24 in relation to the modulating valve seat 20, I provide an electrically operable "heat" motor in the form of a modulating valve actuating bimetal 68. This bimetal carries a contact 70 for coaction at times with a contact 72 mounted on an actuating blade 74 of insulation material. The blade 74 is pivoted at 76 as by means of a leaf spring and at its opposite end carries an actuating pin 78 adapted to coact through the diaphragm 28 with the upper end of the stem 23 as shown in Figures 4 and 5.

Normally the bimetal 68 is in the elevated position of Figure 3 with the contact 70 out of engagement with the contact 72 and the upper end of the actuating pin 78 stopped against a stop 80 which is adjustable for minimum flame when the main valve is modulating. The stop 80 is in the form of a screw threaded in a bracket 82.

For warping the bimetal element 68 downwardly in response to heat as indicated by the arrow $h$ crossing the bimetal in Figure 3, I provide a heating element 84. Supply wires 86 and 88 supply current therefor through a room thermostat RT.

The wire 86 also connects with the contact 72; whereas the contact 70 is connected by a wire 90 to the heating element 66 for the bimetal blade 56 of the pilot valve whereby the heating element of the pilot valve is under control of the contacts 70 and 72.

A wire 92 leads from the right hand end of the heating element 84 in Figure 3 to a heater 94 in the room thermostat RT, the room thermostat having an auxiliary bimetal 96 responsive to the heater 94. The auxiliary bimetal carries a contact 98 for cooperation with a contact 100 carried by the main bimetal 102 of the room thermostat, which latter bimetal is the one responsive to room temperature.

Practical operation

With the room thermostat RT satisfied and therefore the contact 100 separated from the contact 98, the parts will be in the position shown in Figure 3. The bimetal 68 will be cold and therefore its contact 70 will be separated from the contact 72. Accordingly, the heating element 66 and therefore the bimetal 56 will be cold, as a result of which the pilot valve will be in the position shown in Figure 2 with the bleed seat 36 closed by the valve closure element 49 and the inlet seat 34 open. The gas pressure through the pressure tube 38 has charged the pressure chamber 30 for holding the valve closing element 22 on the on-off seat 18 because of pressure in the chamber 30 predominating that below the diaphragm 26, the latter having less area because of the valve seat 18.

As the room temperature lowers, the contact 100 of the room thermostat RT will eventually engage the contact 98 whereupon a circuit is established in the heater 84 for the bimetal 68. This current also passes through the heater 94 of the room thermostat and warps the bimetal element 96 in the direction of the arrows $h'$ so as to separate the contact 98 from the contact 100. Continued reduction in room temperature, however, causes the contact 100 to keep moving toward the right and there will accordingly be increments of electrical energization of the heating element 84 which cause the bimetal element 68 to continue to warp downwardly and make contact of 70 with 72 whereupon a circuit is established through the pilot valve heater 66. Since the burner is not yet in operation, the room temperature will continue to lower and the bimetal element 68 will likewise continue to move downwardly, carrying with it the actuating pin 78.

Within a short period of time, the heating element 66 will have heated the bimetal element 56 sufficiently for the toggle 64 to snap from the position of Figure 2 to the position of Figure 4, thereby closing off the pressure from the tube 38 to the pressure chamber 30 and instead permitting the pressure to be bled out of the chamber 30 through the bleed seat 36. This seat is connected as by means of a tube 37 to the burner chamber for discharging adjacent the burner so that the gas from the tube will be burned. Pressure under the diaphragm 26 will raise the valves 22 and 24 and as soon as 22 leaves the seat 18, the effective diaphragm area is increased so that the valve 22 will move rapidly to the wide open position shown in Figure 4, thus moving the valve element 24 to a position adjacent the modulating seat 20. It is stopped, however, by the stop 20 as in Figure 4 which gives a minimum opening of the modulating valve 20—24 for minimum flame at the burner so that it burns at a low flame but with complete combustion. The main valve thus passes from completely closed position through the wide-open position to a minimum modulated position.

As the room thermostat RT continues to call for heat, the bimetal 96 of the thermostat will warp toward the right as in Figure 5 under the action of the increments of energization in the heater 84 and the continued increments of energization thereof will cause the bimetal 68 to continue to warp downwardly as in Figure 5 to a modulated position such as that shown by solid lines. Thereafter the main valve will be modulated (the valve element 24 relative to the modulating seat 20) depending on room temperature requirements. The auxiliary bimetal 96 is heated by the heater 94 so as to cause the control circuit to cycle with a speed dependent upon the position of the room temperature responsive bimetal 102. Further demand for heat by the room thermostat after 22 is unseated from 18 increases the heat in the heater 84 and causes the bimetal 68 to open the valve 22 from the minimum modulated position to a position corresponding to the demand as indicated by the room thermostat. Any lessening of the value of heat demanded by the thermostat reduces the heating effect on the bimetal 68 causing it to move toward the minimum modulated position. A further reduction in demand finally opens the circuit at 70—72 allowing the pilot valve to effect closing off completely of the main valve.

The modulating valve structure disclosed performs three functions: (1) a means of turning on and off the supply of fuel; (2) a means for modulating its flow after it has been turned on; and (3) a means for adjusting the minimum flame. Functions (1) and (2) are handled entirely by the one bimetal 68 acting first on a pilot valve and secondly on the main valve to modulate it.

Describing the operation in greater detail, if the room temperature continues to drop during the modulating cycle of the main valve, the bimetal element 68 will continue to warp downwardly and finally reach the maximum open position of 24 with respect to 20 shown in Figure 5 with the actuating blade 74 against a maximum stop 75 as shown by dotted lines in Figure 5.

As the room temperature rises due to the operation of the burner, the increments of energization will be less in a given period of time, and/or of shorter duration, thereby permitting the bimetal element 68 to seek a higher level which results in the valve 24 modulating in a closing direction.

Finally when the room thermostat is satisfied to such an extent that the main valve returns to the position of Figure 4 with the actuating blade 74 against the minimum flame stop 80, any further heating up of the room thermostat will permit the heating element 84 to be de-energized sufficiently for the contact 70 to leave the contact 72 thereby breaking the circuit for the heating element 66. When this element and the bimetal blade 56 cool sufficiently, the pilot valve will snap again to the position of Figure 2 thereby introducing pressure through the pressure tube 38 to the pressure chamber 30 for closing the main valve again to the position of Figure 3 where it remains until there is another call for heat by the room thermostat.

Some changes may be made in the construction and arrangement of the parts of my gas modulating valve control, without departing from the real spirit and purpose of my invention, and it is my intention to cover by my claims any modified forms of structure or use of mechanical equivalents which may be reasonably included within their scope.

I claim as my invention:

1. A modulating main control valve for supplying gas to a burner, said valve having an on-off seat, an on-off valve disk to seat thereon toward the gas inlet, and a modulating valve disk, a pilot valve for said control valve having a bleeder line, said control valve including a diaphragm responsive on one side surrounding said on-off seat to the inlet gas pressure, a pressure chamber on the other side thereof, said pilot valve being operable to admit gas pressure to said pressure chamber or connect the same with said bleeder line for respectively closing said valve at said on-off seat or opening the same, means for modulating said modulating valve disk in accordance with room temperature after said on-off valve disk is opened comprising a thermostatic valve therefor, said thermostatic motor including a heating coil, a room thermostat for controlling the input to said heating coil, said room thermostat including a heater in series therewith and means responsive to heat from said heater and including a contact movable thereby in relation to a second contact controlled by the room temperature responsive element of the room thermostat for separating said room thermostat contacts and repositioning them in joint response to said means and said room temperature responsive element, and means for controlling said pilot valve comprising contacts operated by said thermostatic motor to be closed when said room thermostat calls for heat and to remain closed as long as said thermostatic motor is operating in the modulating range.

2. A modulating control for fuel flow to heating means comprising pressure motor means including a movable wall having a chamber on each side thereof, a main fuel flow passageway sealed by said movable wall, a pair of spaced valve seats in said passageway, one of which constitutes a modulating valve seat and the other of which constitutes an on-off valve seat, a unitary valve structure operated by said pressure motor means and including a modulating valve and an on-off valve cooperating respectively with said modulating valve seat and said on-off valve seat, said valve seats constituting ports arranged in series for the fuel flow, said valves simultaneously moving in alternate directions to perform their respective functions of modulation and cut-off, said movable wall being subject on one side surrounding said on-off seat to the line pressure and on its other side to either the line pressure or atmospheric pressure to close or open the valve at said on-off valve seat, means operated in response to variations in predetermined external conditions for adjusting said pressures for opening said valve at said on-off seat and for thereafter modulating said valve at said modulating seat, and means for causing the pressures on opposite sides of the movable wall to approach equality to an extent sufficient for said movable wall to close said valve at said on-off seat after said predetermined external conditions are satisfied.

3. A combined modulating and cut-off valve device for fuel line to a burner comprising pressure motor means having a first chamber and a second chamber divided by a movable wall, a pair of spaced valve seats forming ports arranged in series for the fuel flow, a modulating valve for the fuel flow cooperating with one seat and a cut-off valve for the fuel flow cooperating with the other seat, both of said valves being mechanically controlled from said pressure motor means, said valve device having a passageway leading from the inlet thereof to said first chamber, said second chamber being subject to the inlet pressure in said valve device, control means independent of both said modulating valve and said cut-off valve for selectively connecting said first chamber to said passageway or to atmosphere, pilot control means operable in response to room temperature changes for operating said control means through said pressure motor means at a predetermined temperature, said pressure motor means thereafter modulating said valve device when the room temperature is below said predetermined temperature.

4. A combination modulating valve and shut-off valve assembly comprising a valve housing having an inlet and an outlet, a modulating valve disposed in said valve housing, a shut-off valve disposed in said housing, a modulating valve member and a shut-off valve member connected together, a diaphragm secured to said valve members, a pressure chamber having said diaphragm as a movable wall thereof, a pilot valve for controlling the pressures to and from said pressure chamber, a modulating motor for said modulating valve, and means operated thereby at one of its limits of operation to actuate said pilot valve to effect opening of said on-off valve as said modulating motor moves away from its minimum modulated position and to effect closing thereof as it returns to its minimum modulated position.

5. In a mechanism of the kind described, a valve device having an inlet and an outlet, on-off and modulating valve seats between the inlet and an outlet, said on-off seat being toward the inlet and said modulating seat being toward the outlet, walls joining the two seats, a pair of interconnected valve members movable one toward said on-off valve seat while the other recedes from said modulating valve seat, a pressure chamber including a member movable in response to pressure changes, means connecting said movable member with said valve members to move them, one away from said modulating valve seat upon decrease of pressure in said pressure chamber, said movable member, opposite said pressure chamber being subject to inlet pressure to said valve device, a connection joining the pressure chamber to exhaust, means controlling the connections to admit inlet pressure to the chamber to open the valve member relative to said on-off seat whereupon the other valve member may effect modulation of the valve after it is opened, and motor means to cause such modulation.

6. A modulating control valve for gas burners comprising a valve having an on-off seat and a modulating seat, valve closure elements for cooperating with said seats, means extending through both seats for connecting said closure elements rigidly together, a diaphragm for supporting said valve closure elements and said means, one side of said diaphragm surrounding said on-off seat being subject to the gas pressure, a pressure chamber on the other side thereof, a pilot valve for introducing gas under pressure to said pressure chamber or bleeding it therefrom for closing one of said valve closure elements on its on-off seat or opening the same, and means for thereafter modulating the other of said valve closure elements relative to said modulating seat comprising a heat motor, and a room thermostat of modulating type for energizing said heat motor, said heat motor in all positions, except its cold position, energizing said pilot valve for closing said bleed and introducing pressure to said pressure chamber.

References Cited in the file of this patent

UNITED STATES PATENTS

| Number | Name | Date |
|---|---|---|
| 2,285,913 | Derrah | June 9, 1942 |
| 2,381,799 | Berkholder | Aug. 7, 1945 |
| 2,490,420 | Davis | Dec. 6, 1949 |
| 2,576,246 | Taylor | Nov. 27, 1951 |
| 2,611,542 | Crum | Sept. 23, 1952 |